United States Patent [19]
Schlotterbeck et al.

[11] Patent Number: 5,287,105
[45] Date of Patent: Feb. 15, 1994

[54] AUTOMATIC TRACKING AND SCANNING CURSOR FOR DIGITIZERS

[75] Inventors: David L. Schlotterbeck, Anaheim; Julio L. Guardado, Fullerton, both of Calif.

[73] Assignee: CalComp Inc., Anaheim, Calif.

[21] Appl. No.: 743,801

[22] Filed: Aug. 12, 1991

[51] Int. Cl.$^5$ .................. H03M 11/00; C09G 3/02; C06K 9/22
[52] U.S. Cl. .................. 341/20; 382/59; 382/60; 345/157
[58] Field of Search .......... 382/59, 60, 67; 341/20; 340/706, 709, 710; 178/18, 19; 364/474.26, 474.27, 571.08, 167.01, 188, 190, 189, 516, 561, 562, 563

[56] References Cited
U.S. PATENT DOCUMENTS

| | | | |
|---|---|---|---|
| 4,181,952 | 1/1980 | Casey et al. | 382/59 |
| 4,809,351 | 2/1989 | Abramovitz et al. | 382/67 |
| 4,969,054 | 11/1990 | Tsugi et al. | 382/59 |
| 5,132,673 | 7/1992 | Ciavarella et al. | 340/710 |

Primary Examiner—Donald J. Yusko
Assistant Examiner—R. Gray
Attorney, Agent, or Firm—Donald A. Streck; Wm F. Porter, Jr.

[57] ABSTRACT

This is a hand cursor for a digitizing system allowing easier positioning of the cursor at the points to be digitized. The cursor includes a quasi-sight window having a CCD panel for viewing a 2-dimensional area and an LCD panel for displaying it to the user. There is a vertical positioning line on the panel. A position signal generator is disposed in the cursor for continuously generating and outputting positional data from which a reference point position and the orientation of the positional line on the tablet surface can be dynamically determined. There is also position determination logic for inputting the electrical signal output from the CCD panel and the positional data from the positional generator and for determining a point on the tablet surface where the positional line crosses a line contained in a drawing disposed on the tablet surface over which the quasi-sight window is positioned as a point to digitize.

18 Claims, 2 Drawing Sheets

AUTOMATIC TRACKING AND SCANNING CURSOR FOR DIGITIZERS

BACKGROUND OF THE INVENTION

This invention relates to digitizing systems for inputting positional data to a computer or the like and, more particularly, in a hand-operated digitizing system wherein a cursor is hand-positioned at points to be digitized on a line contained in a drawing disposed on a tablet surface and the position of the cursor is determined by a sensed interaction between the cursor and the tablet, to the improvement to allow easier positioning of the cursor at the points to be digitized comprising, a quasi-sight window in the cursor comprising, sensing means for viewing a 2-dimensional area and developing an electrical signal output reflecting the contents of the 2-dimensional area, and display means connected to receive the electrical signal output for displaying the contents of the 2-dimensional area; a positional line disposed across the display means; positional signal generation means disposed in the cursor for continuously generating and outputting positional data from which a reference point position and the orientation of the positional line on the tablet surface can be dynamically determined; and, position determination logic means for inputting the electrical signal output from the sensing means and the positional data from the positional signal generation means and for determining a point on the tablet surface where the positional line crosses a line contained in a drawing disposed on the tablet surface over which the quasi-sight window is positioned as a point to digitize.

Digitizing systems for inputting positional data to a computer are well known and used in the art. Basically, prior art digitizers fall into two broad groups—automated digitizers and hand digitizers. Automated digitizers are quite expensive and, therefore, not as widely used as hand digitizers. In an automated digitizer, the vectors comprising the material to be digitized are scanned by an optical scanner in substantially the same way as a facsimile machine scans a document to be transmitted. In a hand digitizing system, a document 10 having vector data such as the curve 12 to be digitized is temporarily attached to the surface of a digitizing tablet 14. An operator then moves a cursor 16 over the curve 12 by hand while keeping the cross-hairs 18 of a transparent sight window 20 on the curve 12. At each point on the curve 12 where data is to be output, one of the buttons 22 is pushed to generate a read signal which is recognized by the computer (not shown) attached thereto. The position of the cursor 16 (and in particular the position of the cross-hairs 18) is sensed by an interaction between the tablet 14 and the cursor 16. Various techniques are employed for this sensing, which are not necessary to an understanding of the need for the present invention. It is only important to note that there is a sensing interaction between the cursor 16 and the tablet 14. It is important to note, however, that a small job of digitizing with such prior art equipment is easily accomplished; but, larger jobs become tedious very quickly if they are to be done with any degree of accuracy. The user must be constantly vigilant to keep the cross-hairs on the curve 12, for example. This results in a high degree of stress and a high intensity environment for the use of the equipment.

Wherefore, it is an object of this invention to provide a hand digitizing system in which digitizing of data through line following techniques can be accomplished in a low stress environment.

It is another object of this invention to provide a hand digitizing system in which digitizing of data through line following techniques can be accomplished in a semi-automated manner.

Other objects and benefits of the invention will become apparent from the detailed description which follows hereinafter when taken in conjunction with the drawing figures which accompany it.

SUMMARY

The foregoing objects have been achieved by the hand-operated digitizing system of the present invention for connection to a computer to provide inputs thereto including a cursor to be hand-positioned at points to be digitized on a line contained in a drawing disposed on a tablet surface and allowing for easier positioning of the cursor at the points to be digitized comprising, a digitizing tablet connected to the computer and including a first portion of positional determination apparatus; a cursor connected to the tablet and including a second portion of the positional determination apparatus whereby a position and orientation of the cursor on a top surface of the digitizing tablet can be determined, the cursor further including a quasi-sight window comprising, sensing means for viewing a 2-dimensional area and developing an electrical signal output reflecting the contents of the 2-dimensional area, display means connected to receive the electrical signal output for displaying the contents of the 2-dimensional area, and a positional line disposed across the display means, the positional line including a principle data point indicator; the second portion of the positional determination apparatus including positional signal generation means for continuously generating and outputting positional data from which a reference point position and the orientation of the positional line on the top surface of the tablet can be dynamically determined; and, position determination logic means for inputting the electrical signal output from the sensing means and the positional data from the positional signal generation means and for determining a point on the top surface of the tablet where the positional line crosses a line contained in a drawing disposed on the top surface of the tablet over which the quasi-sight window is positioned as a point to digitize, the position determination logic means further including logic to pick an intersection point closet to the principle data point indicator as the point to digitize whereby the cursor can be used on a crowded drawing where more than one line or curve may be within the quasi-sight window at any one time and be intersected by the positional line.

In the preferred embodiment, the sensing means comprises a charge coupled device (CCD) and the display means comprises a liquid crystal display (LCD) panel. Moreover, the CCD comprises a CCD panel positioned directly over a bottom opening in the cursor in an area of the quasi-sight window. The preferred embodiment also includes virtual display memory means for receiving and storing digital data from the CCD reflecting the contents of the 2-dimensional area and for outputting the digital data to drive the LCD panel and microprocessor means included within the position determination logic means for inputting the digital data from the virtual display memory means and for determining the location of lines contained in the 2-dimensional area.

DESCRIPTION OF THE PREFERRED EMBODIMENT

Figure 1:
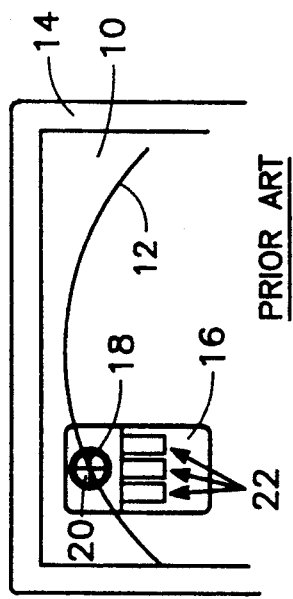
FIG. 1 is a simplified drawing depicting the prior art approach to hand digitizing of data.
Figure 2:
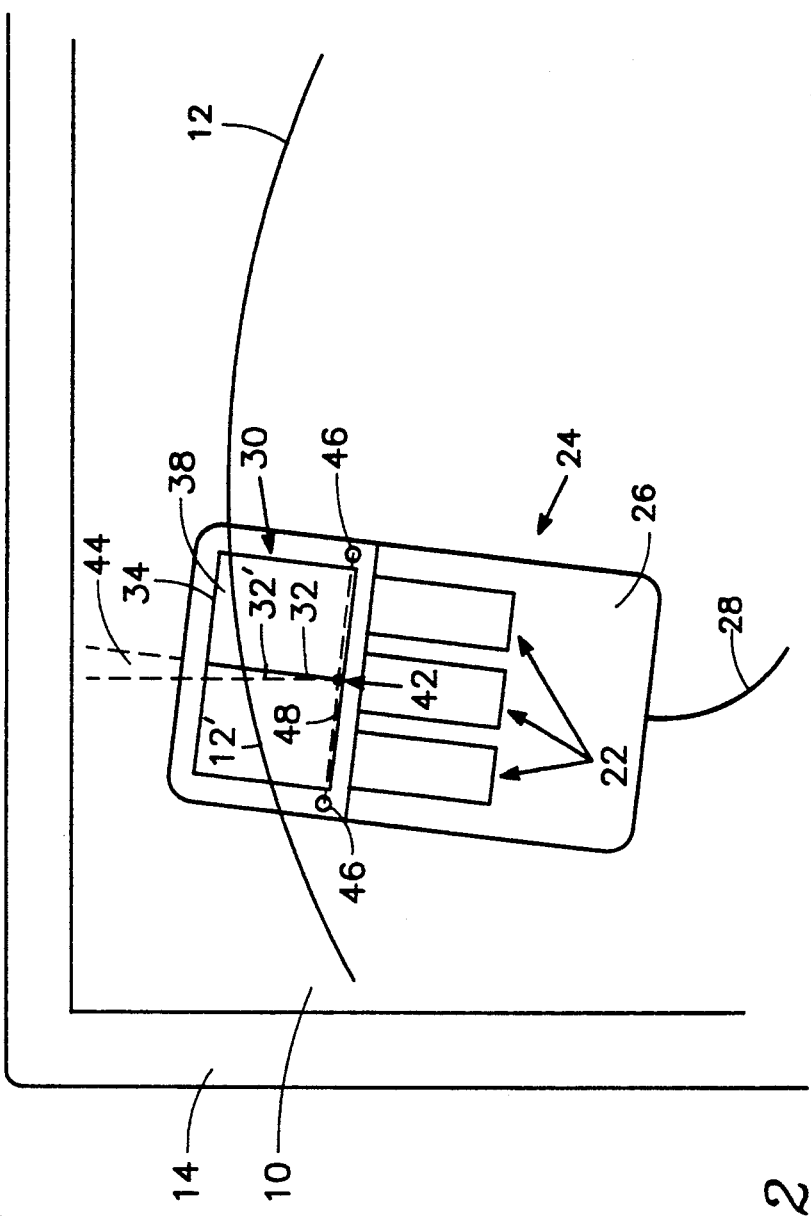
FIG. 2 is a simplified drawing depicting the approach of the present invention to the hand digitizing of data.

The basic approach of the present invention is depicted in simplified form in FIG. 2. As in the previous drawing figure, there is a document 10 containing a curve 12 to be digitized positioned on and attached to the surface of a digitizing tablet 14. The stand-alone cursor 24 of this invention has a body 26 for gripping by the hand of a user and buttons 22 for indicating selection information to a computer, or the like, by the user. The cursor 24 is connected to the tablet 14 by the connecting cable 28. A quasi-sight window 30 occupies the forward portion of the body 26. Unlike the sight window 20 of the prior art devices, the quasi-sight window 30 is not transparent. Rather, as will be seen shortly, the curve portion 12' seen within the quasi-sight window 30 is actually a representation thereof on a display. A straight vertical positional line 32 is positioned in the middle of the quasi-sight window 30 and takes the place of the prior art cross-hairs 18. As long as the curve portion 12' is within the quasi-sight window 30, the point thereof intersected by the positional line 32 is the position which is output.

Figure 3:
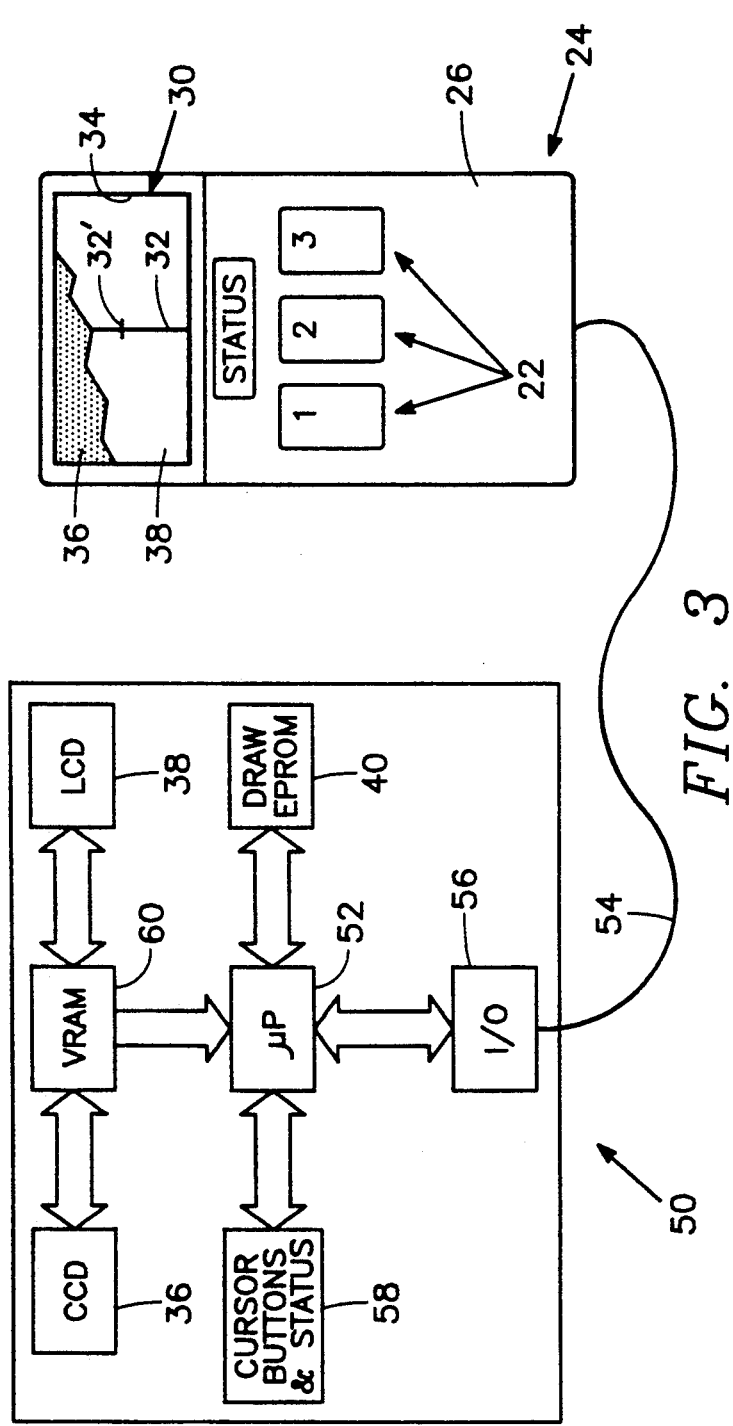
FIG. 3 is a functional block diagram of a digitizing system according to the present invention.
Figure 4:
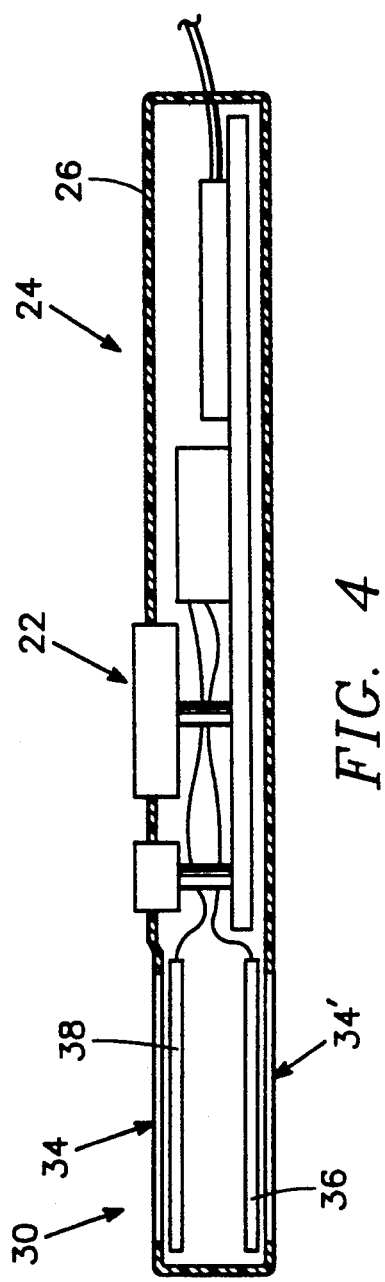
FIG. 4 is a partially cutaway side view of a hand digitizer according to the present invention.

The way in which this is accomplished according to the technical aspects of the present invention can best be understood with reference to FIGS. 3 and 4 in combination with FIG. 2. The body 26 in the area of the quasi-sight window 30 has rectangular openings 34, 34' on the top and bottom, respectively. A charge couple device (CCD) sensing panel 36 is fastened over the bottom opening 34' inside of the body 26 while a liquid crystal display (LCD) panel 38 is fastened over the top opening 34 inside of the body 26. The CCD panel 36 and the LCD panel 38, in combination, "see" and display the "view" under the bottom opening 34'. The accuracy of the digitizing process is determined in part by the accuracy of the components used for the CCD panel 36 and the LCD panel 38 (principally the CCD panel 36); but, as will be appreciated from the description which follows hereinafter, another important source of accuracy is the sensing aspects of the tablet 14 and cursor 24 in combination, which is preferably according to techniques well known in the art which can produce highly accurate positional data in such instances.

Unlike prior art automated optical scanning systems where the viewing apparatus is fixed in orientation, as those skilled in the art will readily recognize and appreciate, the cursor 24 of this invention can be held by a user in various orientations on the surface of the tablet 14. Accordingly, the position-determining algorithms implemented as part of the operational logic contained in the EPROM 40 (to be discussed shortly) must take all this into consideration. Returning once again to FIG. 2 with particularity, what is required is know the exact position of a reference point 42 on the vertical positional line 32 as well as the tilt angle 44 of the vertical positional line 32. This is accomplished by employing two sensing points 46 within the body 26 rather than the one employed in the prior art devices at the location of the center of the cross-hairs 18. The assignee of this application employs coils in the cursors of its commercial digitizing products so as to interact electromagnetically with their tablets; so, it is preferred that a pair of coils be located at respective ones of the sensing points 46. It is most convenient to locate the sensing points 46 so as to be along a line 48 perpendicular to the positional line 32 and passing through the reference point 42 as indicated in the drawing. Employing well-known prior art techniques for digitizing, the position of the two sensing points 46 can be determined dynamically as the cursor 24 is moved over the surface of the tablet 14. Two points, of course, can be employed according to well-established mathematical techniques to determine a straight line. Thus, with the two end points determined at any point in time, it is a simple matter to determine the placement of the vertical positional line 32 and, employing standard mathematical interpolation techniques, to determine the location on the surface of the tablet 14 of the point of intersection between the curve 12, for example, and the vertical positional line 32. That, of course, is what is required mathematically to attain the objectives of this invention. In the case of use of the cursor 24 on a crowded drawing where more than one line or curve may be within the quasi-sight window 30 at any one time and be intersected by the vertical positional line 32, the center of the vertical positional line 32 is indicated by a crossing tick line 32' and the positional determination logic picks the intersection point closest to the crossing tick line 32' as the point to digitize.

Turning once again to FIGS. 3 and 4 with particularity, the various functional elements of a digitizing system according to the present invention in a preferred embodiment thereof will now be addressed. In the interest of simplicity and the avoidance of redundancy, further considerations of the sensing that takes place between the cursor 24 and the tablet 14 will not be addressed further since, as mentioned earlier herein, it is preferred that they be accomplished according to techniques well known in the art for producing accurate results. The drawing of FIG. 3 will be seen to be somewhat of a composite drawing as the placement of functional components will be dependent upon the particular implementation into which they are incorporated. Further, computational components that can be shared with the computational components of the digitizing system and tablet 14, preferably will be so shared. In any event, the heart of the digitizing system 50 is the micro-processor 52. Positional and button-pushing signal information from the cursor 24 is input on line 54 through the input/output interface 56 to the micro-processor 52. The logic and firmware embodying the algorithms discussed above is contained in the EPROM 40. It is this logic which controls the operation of the system 50. Dynamic data concerning the position of the cursor 24, the buttons 22, and the status of the process are contained in memory 58 as stored and retrieved by the micro-processor 52. The VRAM 60 comprises a display memory into which the dynamic input from the CCD panel 36 is input. This serves two functions within the present invention. For one, the contents of the display memory of the VRAM 60 is constantly output to the LCD panel 38 so as to provide the dynamic view within the quasi-sight window 30. For another, it can be input by the micro-processor 52 to provide the data on what is being "seen" by the CCD panel 36 to allow the logic being executed in the micro-processor 52 to determine (in combination with the cursor positional information input on line 54) the points to digitize.

Wherefore, having thus described our invention, what is claimed is:

1. In a hand-operated digitizing system wherein a cursor is hand-positioned at points to be digitized on a line contained in a drawing disposed on a tablet surface and the position of the cursor is determined by a sensed interaction between the cursor and the tablet, the improvement to allow easier positioning of the cursor at the points to be digitized comprising:

a) a quasi-sight window in the cursor comprising, a1) sensing means for viewing a 2-dimensional area and developing an electrical signal output reflecting the contents of said 2-dimensional area, and a2) display means connected to receive said electrical signal output for displaying the contents of said 2-dimensional area;

b) a positional line disposed across said display means;

c) positional signal generation means disposed in the cursor for continuously generating and outputting positional data from which a reference point position and the orientation of said positional line on the tablet surface can be dynamically determined; and, d) position determination logic means for inputting said electrical signal output from said sensing means and said positional data from said positional signal generation means and for determining a point on the tablet surface where said positional line crosses a line contained in a drawing disposed on the tablet surface over which said quasi-sight window is positioned as a point to digitize.

2. The improvement to a hand-operated digitizing system of claim 1 wherein:

for use of the cursor on a crowded drawing where more than one line or curve may be within said quasi-sight window at any one time and be intersected by said positional line, said positional line includes a crossing tick line and said position determination logic means includes logic to pick an intersection point closest to said crossing tick line as said point to digitize.

3. The improvement to a hand-operated digitizing system of claim 1 wherein:

a) said sensing means comprises a charge coupled device (CCD); and, b) said display means comprises a liquid crystal display (LCD) panel.

4. The improvement to a hand-operated digitizing system of claim 3 wherein:

said CCD comprises a CCD panel positioned directly over a bottom opening in the cursor in an area of said quasi-sight window.

5. The improvement to a hand-operated digitizing system of claim 3 and additionally comprising:

virtual display memory means for receiving and storing digital data from said CCD reflecting said contents of said 2-dimensional area and for outputting said digital data to drive said LCD panel.

6. The improvement to a hand-operated digitizing system of claim 5 and additionally comprising:

microprocessor means included within said position determination logic means for inputting said digital data from said virtual display memory means and for determining the location of lines contained in said 2-dimensional area.

7. A hand-operated digitizing system for connection to a computer to provide inputs thereto including a cursor to be hand-positioned at points to be digitized on a line contained in a drawing disposed on a tablet surface and allowing for easier positioning of the cursor at the points to be digitized comprising:

a) a digitizing tablet connected to the computer and including a first portion of positional determination apparatus;

b) a cursor connected to the tablet and including a second portion of said positional determination apparatus whereby a position and orientation of said cursor on a top surface of said digitizing tablet can be determined, said cursor further including a quasi-sight window comprising, b1) sensing means for viewing a 2-dimensional area and developing an electrical signal output reflecting the contents of said 2-dimensional area, b2) display means connected to receive said electrical signal output for displaying the contents of said 2-dimensional area, and b3) a positional line disposed across said display means;

c) said second portion of said positional determination apparatus including positional signal generation means for continuously generating and outputting positional data from which a reference point position and the orientation of said positional line on said top surface of said tablet can be dynamically determined; and, d) position determination logic means for inputting said electrical signal output from said sensing means and said positional data from said positional signal generation means and for determining a point on said top surface of said tablet where said positional line crosses a line contained in a drawing disposed on said top surface of said tablet over which said quasi-sight window is positioned as a point to digitize.

8. The hand-operated digitizing system of claim 7 wherein:

for use of said cursor on a crowded drawing where more than one line or curve may be within said quasi-sight window at any one time and be intersected by said positional line, said positional line includes a crossing tick line and said position determination logic means includes logic to pick an intersection point closest to said crossing tick line as said point to digitize.

9. The hand-operated digitizing system of claim 7 wherein:

a) said sensing means comprises a charge coupled device (CCD); and, b) said display means comprises a liquid crystal display (LCD) panel.

10. The hand-operated digitizing system of claim 9 wherein:

said CCD comprises a CCD panel positioned directly over a bottom opening in said cursor in an area of said quasi-sight window.

11. The hand-operated digitizing system of claim 9 and additionally comprising:

virtual display memory means for receiving and storing digital data from said CCD reflecting said contents of said 2-dimensional area and for outputting said digital data to drive said LCD panel.

12. The hand-operated digitizing system of claim 11 and additionally comprising:
microprocessor means included within said position determination logic means for inputting said digital data from said virtual display memory means and for determining the location of lines contained in said 2-dimensional area.

13. A hand-operated digitizing system for connection to a computer to provide inputs thereto including a cursor to be hand-positioned at points to be digitized on a line contained in a drawing disposed on a tablet surface and allowing for easier positioning of the cursor at the points to be digitized comprising:
a) a digitizing tablet connected to the computer and including a first portion of positional determination apparatus;
b) a cursor connected to the tablet and including a second portion of said positional determination apparatus whereby a position and orientation of said cursor on a top surface of said digitizing tablet can be determined, said cursor further including a quasi-sight window comprising,
b1) sensing means for viewing a 2-dimensional area and developing an electrical signal output reflecting the contents of said 2-dimensional area,
b2) display means connected to receive said electrical signal output for displaying the contents of said 2-dimensional area, and
b3) a positional line disposed across said display means, said positional line including a principle data point indicator;
c) said second portion of said positional determination apparatus including positional signal generation means for continuously generating and outputting positional data from which a reference point position and the orientation of said positional line on said top surface of said tablet can be dynamically determined; and,
d) position determination logic means for inputting said electrical signal output from said sensing means and said positional data from said positional signal generation means and for determining a point on said top surface of said tablet where said positional line crosses a line contained in a drawing disposed on said top surface of said tablet over which said quasi-sight window is positioned as a point to digitize, said position determination logic means further including logic to pick an intersection point closest to said principle data point indicator as said point to digitize whereby said cursor can be used on a crowded drawing where more than one line or curve may be within said quasi-sight window at any one time and be intersected by said positional line.

14. The hand-operated digitizing system of claim 13 wherein:
a) said sensing means comprises a charge coupled device (CCD); and,
b) said display means comprises a liquid crystal display (LCD) panel.

15. The hand-operated digitizing system of claim 14 wherein:

said CCD comprises a CCD panel positioned directly over a bottom opening in said cursor in an area of said quasi-sight window.

16. The hand-operated digitizing system of claim 14 and additionally comprising:
virtual display memory means for receiving and storing digital data from said CCD reflecting said contents of said 2-dimensional area and for outputting said digital data to drive said LCD panel.

17. The hand-operated digitizing system of claim 16 and additionally comprising:
microprocessor means included within said position determination logic means for inputting said digital data from said virtual display memory means and for determining the location of lines contained in said 2-dimensional area.

18. A hand-operated digitizing system for connection to a computer to provide inputs thereto including a cursor to be hand-positioned at points to be digitized on a line contained in a drawing disposed on a tablet surface and allowing for easier positioning of the cursor at the points to be digitized comprising:
a) a digitizing tablet connected to the computer and including a first portion of positional determination apparatus;
b) a cursor connected to the tablet and including a second portion of said positional determination apparatus whereby a position and orientation of said cursor on a top surface of said digitizing tablet can be determined, said cursor further including a quasi-sight window comprising,
b1) sensing means for viewing a 2-dimensional area and developing an electrical signal output reflecting the contents of said 2-dimensional area, said sensing means comprising a charge coupled device (CCD) panel positioned directly over a bottom opening in said cursor in an area of said quasi-sight window,
b2) display means connected to receive said electrical signal output for displaying the contents of said 2-dimensional area, said display means comprising a liquid crystal display (LCD) panel, and
b3) a positional line disposed across said display means, said positional line including a principle data point indicator;
c) said second portion of said positional determination apparatus including positional signal generation means for continuously generating and outputting positional data from which a reference point position and the orientation of said positional line on said top surface of said tablet can be dynamically determined;
d) virtual display memory means for receiving and storing digital data from said CCD panel reflecting said contents of said 2-dimensional area and for outputting said digital data to drive said LCD panel;
e) microprocessor means including position determination logic means for inputting said electrical signal output from said sensing means and said positional data from said positional signal generation means and for determining a point on said top surface of said tablet where said positional line crosses a line contained in a drawing disposed on said top surface of said tablet over which said quasi-sight window is positioned as a point to digitize, said position determination logic means further including logic for inputting said digital data from said virtual display memory means, for determining the location of lines contained in said 2-dimensional area, and for picking an intersection point closest to said principle data point indicator as said point to digitize whereby said cursor can be used on a crowded drawing where more than one line or curve may be within said quasi-sight window at any one time and be intersected by said positional line.

* * * * *